United States Patent Office 3,032,544
Patented May 1, 1962

3,032,544
POLYMERIZATION CATALYSTS AND METHOD OF POLYMERIZING DIOLEFINS THEREWITH
Carlo Longiave and Renato Castelli, Novara, Italy, and Gian Francesco Croce, deceased, late of Arona, Italy, by Gaudenzio Croce and Teresa Romerio Bonazzi, heirs, both of Arona, Italy, assignors to Montecatini Società Generale per l'Industria Mineraria e Chimica, Milan, Italy
No Drawing. Filed May 15, 1959, Ser. No. 813,589
Claims priority, application Italy June 18, 1958
12 Claims. (Cl. 260—94.3)

This invention relates to a new polymerization catalyst, and to a process for polymerizing diolefins containing at least one vinyl double bond therewith. More particularly, the invention provides a new catalyst for polymerizing the diolefins, and especially butadiene, to high molecular weight linear polymers having a high content of cis-1,4 structure.

Marullo et al. have shown that butadiene can be polymerized to high polymers with a very high content of cis-1,4 structure in contact with catalysts prepared from organic or inorganic compounds of metals belonging to Group VIII of the Mendeleeff Periodic Table, with organometallic compounds of elements of Groups II or III of the table having the formula $MeR_mX_n$, in which R is an alkyl radical, the sum of $m$ and $n$ represents the valence of the metal Me, and X is halogen.

Using the catalysts just mentioned, butadiene can be readily and reproducibly polymerized to polymers containing up to 98% of cis-1,4 structure.

Surprisingly, we have found that the products obtained by reacting a metal of Group VIII in the metallic state with the organometallic compounds $MeR_mX_n$ are also highly effective catalysts for the polymerization of the diolefins, such as butadiene, particularly when the metal is used in finely divided form. The diolefin polymers obtained using these new catalysts are also linear, high molecular weight materials containing a very high proportion of cis-1,4 structure. By "high proportion," we mean over 90%.

It is found, for instance, according to the invention, that when Raney cobalt or Raney nickel prepared according to the known methods is suspended in an inert hydrocarbon solvent such as benzene and the suspension is combined with an organometallic compound as defined, and particularly with diethyl aluminum monochloride, the resulting product is a catalyst capable of polymerizing the diolefins to polymers containing the high proportion of cis-1,4 structure. Such catalysts are particularly effective for the production of predominantly cis-1,4 polymers of butadiene.

The polymerization of the diolefin in contact with the present catalysts follows a perfectly regular and reproducible course. The proportion of cis-1,4 structure contained in the polymer varies with the polymerization temperature. In general, the proportion of cis-1,4 structure attains a maximum (over 95%) at a polymerization temperature below 20° C. For example, using a catalyst based on Raney cobalt at 5° C., polybutadiene having a content of cis-1,4 structure higher than 96% is obtained very readily.

Moreover, we find that the products obtained by mixing cobalt or nickel powder (obtained by usual methods such as, e.g., filing) with e.g., diethyl aluminum chloride also catalyze the polymerization of the diolefins, notably of butadiene.

The polymerization in contact with these last-mentioned catalysts proceeds somewhat more slowly than when the Raney forms of the metals are used, but the polybutadiene obtained is characterized by the very high proportion of cis-1,4 structure.

While it is usually preferred to use the metal or alloy thereof in finely divided form, i.e. in the form of particles having a size between 1 and 100 microns, we have also found that the metal or alloy used in preparing the catalyst can be rather coarsely ground, and that it is even possible to carry out the polymerization in e.g., an autoclave, having an inner lining of cobalt, nickel, or alloys of those metals (which lining has a roughened surface), the catalyst being formed in that case, by combination of the metal or metal alloy of the lining with an organometallic compound $MeR_mX_n$ introduced into the autoclave. That modification of the invention eliminates the need to prepare the catalyst by separate mixing of the Group VIII metal or alloy thereof, and the organometallic compound.

In the organometallic compound, $MeR_mX_n$, R may be an alkyl radical containing, e.g., from 1 to 5 carbon atoms and X may be a halogen, e.g., chlorine or bromine.

Typical organometallic compounds which are suitable are diethyl aluminum monochloride, diethyl aluminum monobromide, methyl magnesium chloride, etc.

The following examples are given to illustrate the invention, it being understood that these examples are not intended to be limiting.

*Example 1*

In a 3-litre stainless steel autoclave, provided with a stirrer and a jacket for the circulation of the cooling liquid, 2 g. fresh Raney cobalt suspended in 1000 cc. anhydrous benzene, 3.6 g. (0.03 mol) diethyl aluminum monochloride and 150 g. butadiene are introduced.

The autoclave is agitated at 20° C. for 12 hours and is then opened. The very viscous solution contained therein is treated with methanol in order to precipitate the polymer which is washed with further methanol and finally dried at 40° C. under vacuum. 145 g. polybutadiene are thus obtained which, by infrared examination, show the following composition:

| | Percent |
|---|---|
| Trans-1,4 structure | 2.6 |
| Cis-1,4 structure | 95.1 |
| 1,2 structure | 2.3 |

The polymer is completely soluble in toluene; the intrinsic viscosity, determined at 25° C. is 4.32.

*Example 2*

Into an autoclave as in Example 1, 1.0 g. fresh Raney cobalt suspended in 1000 cc. dry benzene, 3.0 g. (0.025 mol) diethyl aluminum monochloride and 180 g. butadiene are introduced. After reaction for 16 hours at 5° C. while stirring, 135 g. polybutadiene are obtained by precipitation with methanol from the reaction solution. After washing and drying, the polymer is subjected to infrared examination: it has the following composition:

| | Percent |
|---|---|
| Trans-1,4 structure | 2.0 |
| Cis-1,4 structure | 96.3 |
| 1,2 structure | 1.7 |

The polymer is 92% soluble in toluene. The insoluble portion shows a swelling index of 145.

The soluble portion has an intrinsic viscosity of 6.88 at 26° C.

*Example 3*

Into an autoclave as in the preceding examples, there are introduced 2 g. fresh Raney nickel suspended in 1000 cc. anhydrous benzene, 3.6 g. (0.03 mol) diethyl aluminum chloride and 155 g. butadiene.

After agitation for 10 hours at 20° C., the autoclave is opened. The polymer obtained, amounting to 140 g., is precipitated with methanol from the reaction solution.

After washing and drying, the polymer is subjected to infrared examination; it shows the following composition:

| | Percent |
|---|---|
| Trans-1,4 structure | 9.8 |
| Cis-1,4 structure | 85.2 |
| 1,2 structure | 4.9 |

The polymer is completely soluble in toluene and has an intrinsic viscosity of 1.84 as determined at 26° C.

*Example 4*

Into an autoclave as in the preceding examples, 1000 cc. anhydrous benzene, 3 g. cobalt filings, 3.6 g. (0.03 mol) diethyl aluminum monochloride and 148 g. butadiene are introduced.

After agitation at 20° C. for 20 hours the autoclave is opened. By precipitation with methanol, 45 g. polybutadiene are obtained which are washed and dried at 40° C. under vacuum. By infrared examination it shows the following composition:

| | Percent |
|---|---|
| Trans-1,4 structure | 3.9 |
| Cis-1,4 structure | 92.7 |
| 1,2 structure | 3.4 |

88% of the polymer is soluble in toluene. The insoluble portion has a swelling index of 138.

The soluble portion has an intrinsic viscosity of 8.1 at 26° C.

The polymerization of the diolefins in contact with our new catalysts can be carried out at temperatures between 0° C. and 40° C., preferablby between 5° C. and 20° C.

The molar ratio of the organometallic compound and the Group VIII metal, used in preparing the catalyst is not critical and may vary over a wide range; the amount of organometallic compound may be very low, particularly when very pure reagents are used; in practice concentrations of 10 to 30 millimols per liter are sufficient.

The foregoing examples clearly demonstrate the effectiveness of our new catalysts in the polymerization of diolefins of the type of butadiene and which contain at least one vinyl double bond. Various changes and modifications can be made in practicing the invention without departing from it and therefore we intend to include in the scope of the appended claims all such modifications and variations as may be apparent to those skilled in the art from the description and illustrative examples given herein.

We claim:

1. A polymerization catalyst prepared by combining a substance selected from the group consisting of cobalt, nickel, alloys of cobalt and alloys of nickel with a dialkyl aluminum monohalide selected from the group consisting of the monochlorides and monobromides in which the alkyl groups contain from 1 to 5 carbon atoms.

2. A polymerization catalyst prepared by combining a substance selected from the group consisting of cobalt, nickel, alloys of cobalt and alloys of nickel with a dialkyl aluminum monobromide in which the alkyl groups contain from 1 to 5 carbon atoms.

3. A polymerization catalyst prepared by combining a substance selected from the group consisting of cobalt, nickel, alloys of cobalt, and alloys of nickel with a dialkyl aluminum monochloride in which the alkyl groups contain from 1 to 5 carbon atoms.

4. A polymerization catalyst prepared by combining a substance selected from the group consisting of cobalt, nickel, alloys of cobalt and alloys of nickel with diethyl alumnium monochloride.

5. A polymerization catalyst prepared by combining finely divided cobalt with a dialkyl aluminum monochloride in which the alkyl groups contain from 1 to 5 carbon atoms.

6. A polymerization catalyst prepared by combining finely divided nickel with a dialkyl aluminum monochloride in which the alkyl groups contain from 1 to 5 carbon atoms.

7. A polymerization catalyst prepared by combining finely divided nickel with a dialkyl aluminum monohalide selected from the group consisting of the monochlorides and monobromides in which the alkyl groups contain from 1 to 5 carbon atoms.

8. A process for producing high molecular weight polymers of butadiene having a high proportion of cis-1,4 structure, which process comprises bringing butadiene into contact, at a temperature of from 0° C. to 40° C., with a catalyst prepared by combining a substance selected from the group consisting of cobalt, nickel, alloys of cobalt and alloys of nickel with a dialkyl aluminum monohalide selected from the group consisting of the monochlorides and monobromides in which the alkyl groups contain from 1 to 5 carbon atoms.

9. The process for producing high molecular weight polymers of butadiene having a high proportion of cis-1,4 structure, which process comprises introducing a dialkyl aluminum monohalide selected from the group consisting of the monochlorides and monobromides in which the alkyl groups contain from 1 to 5 carbon atoms and the butadiene to be polymerized into a reactor lined with a substance selected from the group consisting of cobalt, nickel, alloys of cobalt and alloys of nickel, and polymerizing the butadiene at a temperature of from 0° C. to 40° C. and in contact with the catalyst formed from the aluminum compound and the lining of the reactor.

10. A process for producing high molecular weight polymers of butadiene having a high proportion of cis-1,4 structure, which process comprises bringing butadiene into contact, at a temperature of from 0° C. to 40° C., with a catalyst prepared by combining finely divided nickel with diethyl aluminum monochloride.

11. A process for producing high molecular weight polymers of butadiene having a high proportion of cis-1,4 structure, which process comprises bringing butadiene into contact, at a temperature of from 0° C. to 40° C., with a catalyst prepared by combining finely divided cobalt with diethyl aluminum monochloride.

12. A polymerization catalyst prepared by combining finely divided cobalt with a dialkyl aluminum monohalide selected from the group consisting of the monochlorides and monobromides in which the alkyl groups contain from 1 to 5 carbon atoms.

References Cited in the file of this patent

UNITED STATES PATENTS

| 2,212,155 | Ellis | Aug. 20, 1940 |
| 2,781,410 | Ziegler et al. | Feb. 12, 1957 |
| 2,871,276 | Eiszner | Jan. 27, 1959 |
| 2,905,659 | Miller et al. | Sept. 22, 1959 |
| 2,910,461 | Nowlin et al. | Oct. 27, 1959 |